(12) United States Patent
Kim et al.

(10) Patent No.: US 11,665,677 B2
(45) Date of Patent: May 30, 2023

(54) METHOD AND APPARATUS FOR OPERATING BANDWIDTH PART IN WIRELESS COMMUNICATION SYSTEM

(71) Applicant: Samsung Electronics Co., Ltd., Gyeonggi-do (KR)

(72) Inventors: Taehyoung Kim, Seoul (KR); Youngbum Kim, Seoul (KR); Jinyoung Oh, Seoul (KR); Heedon Gha, Gyeonggi-do (KR); Taehan Bae, Seoul (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 47 days.

(21) Appl. No.: 16/754,535

(22) PCT Filed: Oct. 11, 2018

(86) PCT No.: PCT/KR2018/011930
§ 371 (c)(1),
(2) Date: Apr. 8, 2020

(87) PCT Pub. No.: WO2019/074282
PCT Pub. Date: Apr. 18, 2019

(65) Prior Publication Data
US 2020/0275446 A1  Aug. 27, 2020

(30) Foreign Application Priority Data
Oct. 11, 2017 (KR) .......................... 10-2017-0130599

(51) Int. Cl.
*H04W 72/04* (2023.01)
*H04W 72/0453* (2023.01)
*H04W 72/02* (2009.01)

(52) U.S. Cl.
CPC ....... *H04W 72/0453* (2013.01); *H04W 72/02* (2013.01)

(58) Field of Classification Search
CPC .......................... H04W 72/0453; H04W 72/02
See application file for complete search history.

(56) References Cited

U.S. PATENT DOCUMENTS

2016/0127991 A1  5/2016 Ang et al.
2016/0227524 A1  8/2016 Choi et al.
(Continued)

OTHER PUBLICATIONS

PCT/ISA/210 Search Report dated Jan. 16, 2019 issued on PCT/KR2018/011930, pp. 5.
(Continued)

*Primary Examiner* — Rhonda L Murphy
(74) *Attorney, Agent, or Firm* — The Farrell Law Firm, P.C.

(57) ABSTRACT

The present disclosure relates to: a communication technique for converging an IoT technology with a 5G communication system for supporting a higher data transfer rate beyond a 4G system; and a system therefor. The present disclosure can be applied to intelligent services (for example, a smart home, a smart building, a smart city, a smart car or connected car, health care, digital education, retail business, security and safety-related service, etc.) on the basis of a 5G communication technology and an IoT-related technology. The present invention proposes various communication methods and apparatuses according to changes in bandwidth part in a 5G communication system.

14 Claims, 11 Drawing Sheets

(56) References Cited

U.S. PATENT DOCUMENTS

| | | | |
|---|---|---|---|
| 2020/0092880 A1* | 3/2020 | Choi | H04W 72/042 |
| 2020/0136878 A1* | 4/2020 | Yi | H04L 5/0048 |
| 2020/0196343 A1* | 6/2020 | Marinier | H04L 5/0053 |
| 2021/0160785 A1* | 5/2021 | Li | H04W 52/146 |
| 2021/0219347 A1* | 7/2021 | Ou | H04W 74/008 |

OTHER PUBLICATIONS

PCT/ISA/237 Written Opinion dated Jan. 16, 2019 issued on PCT/KR2018/011930, pp. 5.
Vivo, 'Remaining details for bandwidth part operation', R1-1717504, 3GPP TSG RAN WG1 Meeting 90bis, Prague, CZ, (Oct. 3, 2017) pp. 6.
Huawei, 'On bandwidth adaptation', R1-1711424, 3GPP TSG RAN WG1 NR Ad-Hoc Meeting, Qingdao, (Jun. 17, 2017) China, pp. 7.
LG Electronics, 'Remaining issues on bandwidth parts', R1-1717972, 3GPP TSG RAN WG1 Meeting 90bis, Prague, CZ, (Oct. 3, 2017) pp. 10.
Huawei, 'Bandwidth part activation and adaptation', R1-1717905, 3GPP TSG RAN WG1 Meeting #90bis, Prague, Czech Republic, (Oct. 2, 2017) pp. 9.
Samsung, "Signaling to Support Bandwidth Part", R2-1711188, 3GPP TSG-RAN WG2 NR #99bis Meeting, Oct. 9-13, 2017, 7 pages.
Korean Office Action dated Dec. 20, 2021 issued in counterpart application No. 10-2017-0130599, 10 pages.

* cited by examiner

METHOD AND APPARATUS FOR OPERATING BANDWIDTH PART IN WIRELESS COMMUNICATION SYSTEM

PRIORITY

This application is a National Phase Entry of PCT International Application No. PCT/KR2018/011930 which was filed on Oct. 11, 2018, and claims priority to Korean Patent Application No. 10-2017-0130599, which was filed on Oct. 11, 2017, the contents of each of which is incorporated herein by reference.

TECHNICAL FIELD

The disclosure relates to a method and apparatus for transmitting or receiving an uplink/downlink control channel and data channel when operating a bandwidth part in a wireless communication system that supports an ultra-wide bandwidth.

BACKGROUND ART

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network.

In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet is evolving from a human-oriented connection network in which humans generate and consume information to an Internet of Things (IoT) network in which distributed components such as objects exchange and process information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted.

In an IoT environment, through collection and analysis of data generated in connected objects, an intelligent Internet Technology (IT) service to create a new value for peoples' lives may be provided. The IoT may be applied to fields such as those of a smart home, a smart building, a smart city, a smart car, a connected car, a smart grid, health care, a smart home appliance, or high-tech medical services through the convergence of the conventional Information Technology (IT) and various industries.

Accordingly, various attempts to apply the 5G communication to the IoT network are made. For example, technologies, such as a sensor network, machine to machine (M2M) communication, and machine type communication (MTC), are implemented by beamforming, MIMO, and array antenna schemes which are 5G communication technologies. The application of a cloud RAN as the big data processing technology may be an example of convergence of the 5G technology and the IoT technology.

DETAILED DESCRIPTION OF INVENTION

Technical Problem

An evolved NodeB (eNB) is capable of configuring a single bandwidth part or a plurality of bandwidth parts for a user equipment (UE), and one of the bandwidth parts configured for the UE may be activated. If an explicit indication exists or a predetermined time condition is satisfied, a bandwidth part may be changed. To this end, a predetermined period of time may be expended. The predetermined period of time may be different depending on the capacity of a UE and an environment associated with bandwidth part change.

If the currently activated bandwidth part is different from a bandwidth part for transmitting or receiving a control channel, a UE may automatically activate the bandwidth part for transmitting or receiving a control channel according to a predetermined configuration. In this instance, a part of a signal which was transmitted or received in the bandwidth part that was activated may be dropped. Alternatively, the signal which was transmitted or received in the bandwidth part that was activated is maintained as it was, and the transmission or reception of the control channel may be skipped.

The disclosure proposes various embodiments associated with a method and a rule for dropping a signal which was transmitted or received in a bandwidth part before bandwidth part change or a method and a rule for skipping a signal which is to be transmitted or received in a bandwidth part after bandwidth part change, on the basis of a transmission or reception situation of an uplink control channel and data channel.

Solution to Problem

In accordance with an aspect of the disclosure, a method performed by a terminal in a wireless communication system may include: performing transmission or reception of a first signal with a base station in a first bandwidth part; identifying whether a predetermined event occurs; determining switching from the first bandwidth part to a second bandwidth part for performing transmission or reception of a second signal with the base station; and performing, in case that the predetermined event is occurred; a predetermined operation related to the transmission or reception of the first signal or the second signal, during a retuning time associated with the switching.

In accordance with an aspect of the disclosure, a terminal in a wireless communication system may include: a transceiver; and a controller configured to: control the transceiver to perform transmission or reception of a first signal with a base station in a first bandwidth part; identify whether a predetermined event occurs; determine switching from the first bandwidth part to a second bandwidth part for performing transmission or reception of a second signal with the base station; and perform, in case that the predetermined event is occurred, a predetermined operation related to the transmission or reception of the first signal or the second signal during a retuning time associated with the switching.

Advantageous Effects of Invention

According to the disclosure, a method of operating a bandwidth part in 5G may effectively determine a method of transmitting or receiving an uplink/downlink data and control channel in a bandwidth part before bandwidth part change, and a method of transmitting or receiving an uplink/downlink data and control channel in a bandwidth part after bandwidth part change, in consideration of a retuning time required for changing a bandwidth part.

MODE FOR THE INVENTION

Figure 1:
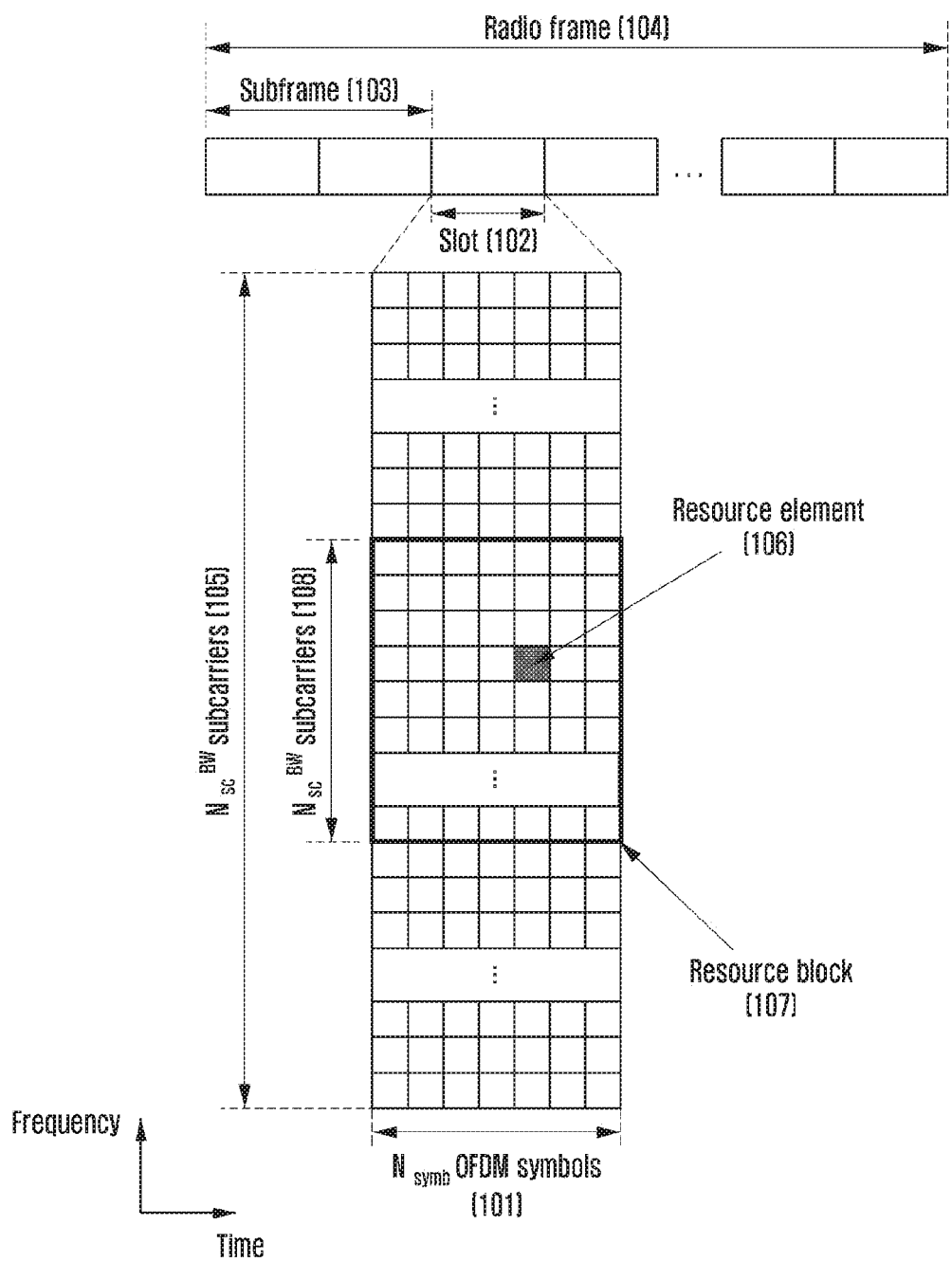
FIG. 1 is a diagram illustrating the basic structure of a time-frequency domain in LTE.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters.

The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, the '~unit' may include one or more processors.

A wireless communication system has developed to be a broadband wireless communication system that provides a high speed and high quality packet data service, like the communication standards, for example, High Speed Packet Access (HSPA) of 3GPP, Long Term Evolution (LTE) or evolved universal terrestrial radio access (E-UTRA), LTE-advanced (LTE-A), High Rate Packet Data (HRPD) of 3GPP2, Ultra Mobile Broadband (UMB), and 802.16e of IEEE, or the like, beyond the voice-based service provided at the initial stage.

An LTE system, which is a representative example of the broadband wireless communication system, employs an Orthogonal Frequency Division Multiplexing (OFDM) scheme for a downlink (DL), and employs a Single Carrier Frequency Division Multiple Access (SC-FDMA) scheme for an uplink (UL). An uplink indicates a wireless link via which a user equipment (UE) or a mobile station (MS) transmits data or a control signal to an eNB (eNode B or base station). A downlink indicates a wireless link via which an eNB transmits data or a control signal to a UE. In the multiple access schemes as described above, time-frequency resources for carrying data or control information are allocated and operated in a manner to prevent overlapping of the resources, i.e. to establish the orthogonality, between users, so as to identify data or control information of each user.

A future communication system after LTE, that is, a 5G communication system, needs to freely apply various requirements from users, service providers, and the like, and thus, a service that satisfies various requirements in parallel needs to be supported. Services considered for the 5G communication system may include an enhanced mobile broadband (eMBB), massive machine type communication (mMTC), ultra reliability low latency communication (URLLC), and the like.

eMBB aims at providing a data transmission rate more enhanced than a data transmission rate supported by legacy LTE, LTE-A, or LTE-pro. For example, in the 5G communication system, eMBB needs to provide a maximum transmission rate (peak data rate) of 20 Gbps in a downlink, and a maximum transmission rate (peak data rate) of 10Gbps in an uplink, from the perspective of a single eNB. Also, the 5G communication system needs to provide an enhanced user perceived data rate of a UE, in parallel with providing a maximum transmission rate.

In order to satisfy the requirements, there is a desire for improvement of various transmission or reception technologies including an advanced multi input multi output (MIMO) transmission technology. Also, LTE transmits a signal in a 2GHz band using a maximum of 20 MHz transmission bandwidth. However, the 5G communication system uses a frequency bandwidth wider than 20 MHz in a frequency band ranging 3 to 6 GHz or in a frequency band greater than or equal to 6 GHz, and thus, the data transmission rate required by the 5G communication system may be satisfied.

Also, the 5G communication system considers mMTC in order to support application services such as Internet of Thing (IoT). mMTC requires supporting access of a large number of UEs within a cell, improvement of coverage of a UE, enhanced battery life expectancy, reduction of cost of a UE, and the like, in order to effectively provide IoT. IoT provides a communication function via attachment to various sensors and various devices and thus, a large number of UEs needs to be supported within a cell (e.g., 1,000,000 UEs/km2).

Also, a UE that supports mMTC has a high probability of being located in a shadow area that a cell cannot cover, such as the basement of a building, in terms of the feature of the service, and may require coverage wider than those of other services of the 5G communication system. The UE that supports mMTC needs to be manufactured as an inexpensive UE, and the battery of the UE may not be changed frequently. Accordingly, a long battery life time such as 10 to 15 years may be required.

URLLC is a cellular-based wireless communication service which is used for mission critical communication. For example, URLLC may include a remote control service for a robot or machinery, an industrial automation service, an unmanned aerial vehicle service, a remote heath care service, an emergency alert service, and the like. Therefore, communication provided by the URLLC may need to provide significantly low latency and significantly high reliability. For example, the service that supports URLLC needs to satisfy an air interface latency less than 0.5 milliseconds, and at the same time, needs to satisfy a packet error rate less than or equal to $10^{-5}$.

Therefore, for the service that supports URLLC, a 5G system needs to provide a transmit time interval (TTI) smaller than those of other services, and in parallel, is required to allocate a wide resource in a frequency band in order to secure reliability of a communication link.

The three services in 5G, that is, eMBB, URLLC, and mMTC may be multiplexed and transmitted in a single system. In this instance, in order to satisfy different requirements of the services, different transmission or reception schemes and transmission or reception parameters may be used among the services.

Hereinafter, the frame structure of LTE and LTE-A systems will be described with reference to enclosed drawings.

FIG. 1 is a diagram illustrating the basic structure of the time-frequency domain, which is a radio resource region where data or a control channel is transmitted in a downlink of an LTE system.

Referring to FIG. 1, the horizontal axis indicates the time domain, and the vertical axis indicates the frequency domain. In the time domain, the minimum transmission unit is an OFDM symbol. One slot 102 includes $N_{symb}$ OFDM symbols 101, and one subframe 103 includes two slots. The length of one slot is 0.5 ms, and the length of one subframe is 1.0 ms. A radio frame 104 is a time domain unit including 10 subframes.

In the frequency domain, the minimum transmission unit is a subcarrier. The entire system transmission bandwidth may include a total of NBW subcarriers 105. In the time-frequency domain, the basic resource unit is a resource element (RE) 106, and an RE is expressed by an OFDM symbol index and a subcarrier index. A resource block (RB) (an RB or a physical resource block (PRB)) 107 is defined by $N_{symb}$ consecutive OFDM symbols 101 in the time domain and NRB consecutive subcarriers 108 in the frequency domain. Therefore, one RB 108 includes $N_{symb} \times N_{RB}$ REs 106. Generally, the minimum transport unit of data is an RB. In the LTE system, generally, $N_{symb}=7$ and $N_{RB}=12$. $N_{Bw}$ and $N_{RB}$ are proportional to a system transmission bandwidth.

Subsequently, downlink control information (DCI) in LTE and LTE-A systems will be described in detail.

In an LTE system, scheduling information associated with downlink data or uplink data is transmitted from an eNB to a UE via DCI. DCI may be operated by defining various formats and applying a corresponding DCI format depending on whether scheduling information is associated with uplink data or downlink data, whether the size of control information is compact DCI, which is small, whether spatial multiplexing, which uses a multi-antenna, is applied, whether DCI is for power control, and the like. For example, DCI format 1 which is scheduling control information associated with downlink data may be configured to at least include the control information as follows.

- Resource allocation type 0/1 flag: indicates whether a resource allocation scheme is type 0 or type 1. Type 0 applies a bitmap scheme and allocates resources in units of resource block groups (RBG). In the LTE system, a basic scheduling unit is a resource block (RB) expressed by time and frequency domain resources, and an RBG includes a plurality of RBs and is used as a basic scheduling unit in the type 0 scheme. Type 1 allows allocation of a predetermined RB in an RBG.
- Resource block assignment: indicates an RB allocated for data transmission. An expressed resource is determined according to the system bandwidth and resource allocation scheme.
- Modulation and coding scheme (MCS): indicates a modulation scheme used for data transmission and the size of a transport block, which is data to be transmitted.
- HARQ process number: indicates the process number of HARQ.
- New data indicator: indicates HARQ initial transmission or retransmission.
- Redundancy version: indicates the redundancy version of HARQ.
- Transmit power control (TPC) command for physical uplink control channel (PUCCH): indicates a transmission power control command for a PUCCH which is an uplink control channel.

The DCI passes through a channel coding and modulation process, and is transmitted via a PDCCH or an enhanced PDCCH which is a downlink physical control channel.

A cyclic redundancy check (CRC) is added to the payload of a DCI message, and the CRC may be scrambled with a radio network temporary identifier (RNTI) corresponding to a UE identity. Different RNTIs may be used depending on the purpose of a DCI message, for example, UE-specific data transmission, power control command, random access response, or the like. That is, an RNTI is not explicitly transmitted, but is transmitted by being included in a CRC calculation process. If a UE receives a DCI message transmitted on a PDCCH, the UE may identify a CRC using an allocated RNTI. If the CRC identification result is correct, the UE may identify that the corresponding message is transmitted to the UE.

Figure 2:
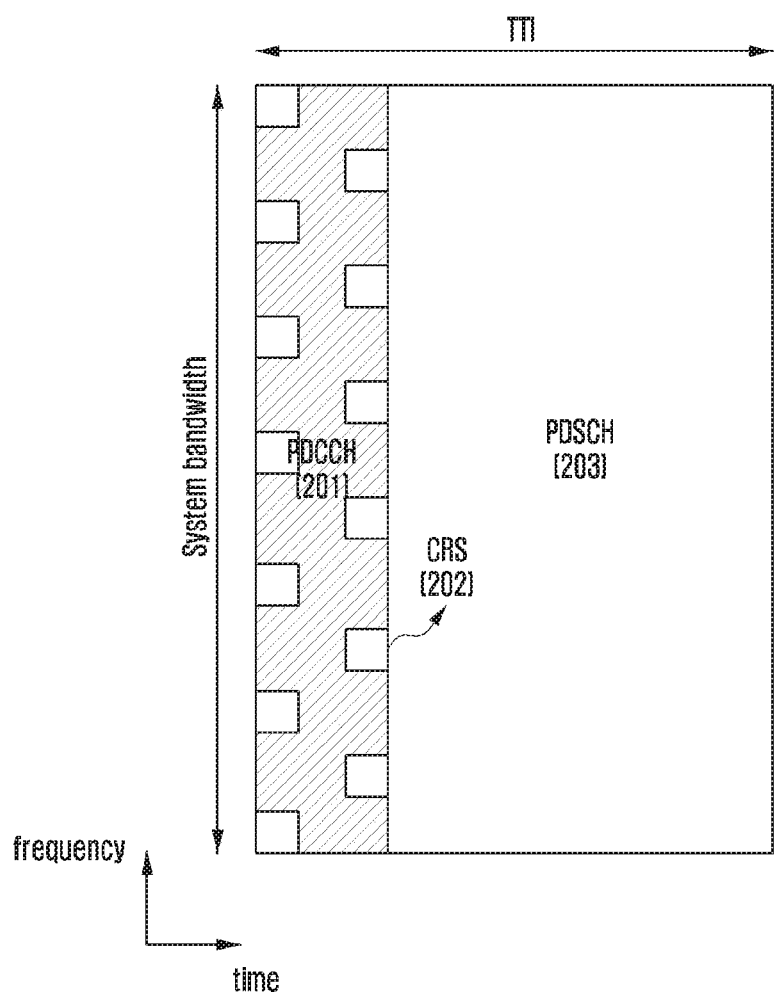
FIG. 2 is a diagram illustrating the transmission structure of a PDCCH in LTE.

FIG. 2 is a diagram illustrating a PDCCH 201 which is a downlink physical channel on which DCI of LTE is transmitted.

Referring to FIG. 2, the PDCCH 201 is time-multiplexed with a PDSCH 203 which is a data transmission channel, and is transmitted over the entire system bandwidth. The region of a PDCCH 201 is expressed as the number of OFDM symbols, which is indicated to a UE using a control format indicator (CFI) transmitted via a physical control format indicator channel (PCFICH). By allocating the PDCCH 201 to OFDM symbols existing in a front part of a subframe, a UE is capable of decoding downlink scheduling allocation as soon as possible. Accordingly, a downlink shared channel (DL-SCH) decoding latency, that is, the overall downlink transmission latency, may be reduced.

A single PDCCH delivers a single DCI message, and a plurality of UEs may be scheduled in parallel in a downlink and an uplink, and thus, transmission of a plurality of PDCCHs may be performed in parallel in each cell. A CRS 203 is used as a reference signal for decoding the PDCCH 201. The CRS 203 is transmitted for each subframe over the entire band, and scrambling and resource mapping may be different for each a cell identity (ID). The CRS 203 is a reference signal used by all UEs in common, and thus, a UE-specific beamforming may not be applied. Therefore, the multi-antenna transmission scheme for a PDCCH of LTE may be limited to an open-loop transmission diversity scheme. The UE implicitly obtains the number of ports of a CRS via decoding a physical broadcast channel (PBCH).

The resource allocation of the PDCCH 201 is performed in units of control-channel elements (CCE), and a single CCE includes 9 resource element groups (REG), that is, a total of 36 resource elements (REs). The number of CCEs required for the predetermined PDCCH 201 may be 1, 2, 4, or 8, which is determined on the basis of the channel coding rate of a DCI message payload. As described above, a different number of CCEs may be used for implementing link adaptation of the PDCCH 201.

The UE needs to detect a signal without knowing information associated with the PDCCH 201. In LTE, a search space indicating a set of CCEs is defined for blind decoding. The search space includes a plurality of sets according to each CCE aggregation level (AL), which is not explicitly signaled but is implicitly defined by a function and subframe number associated with a UE identity. In each subframe, the UE attempts decoding of the PDCCH 201 with respect to all available resource candidates which can be formed from CCEs in a set search space, and processes information declared to be valid for the corresponding UE via CRC check.

The search space may be classified as a UE-specific search space and a common search space. A group of UEs or all UEs may investigate the common search space of the PDCCH 201 in order to receive cell-common control information such as a dynamic scheduling or paging message associated with system information. For example, scheduling allocation information of a DL-SCH for transmission of system information block (SIB)-1 including cell operator information or the like may be received by investigating the common search space of the PDCCH 201.

In LTE, the entire PDCCH region includes a set of CCEs in the logical region, and a search space including a set of CCEs exists. The search space may be classified as a common search space and a UE-specific search space, and the search space for an LTE PDCCH may be defined as follows.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{(Y_k+m') \bmod \lfloor N_{CCE,k}/L \rfloor\}+i$$

where $Y_k$ is defined below, i=0, . . . , L−1. For the common search space m'=m . For the PDCCH UE specific search space, for the serving cell on which PDCCH is monitored, if the monitoring UE is configured with carrier indicator field then m'=m+M$^{(L)}$·n$_{CI}$ where n$_{CI}$ is the carrier indicator field value, else if the monitoring UE is not configured with carrier indicator field then m'=m, where m=0,, . . . , M$^{(L)}$–1. M$^{(L)}$ is the number of PDCCH candidates to monitor in the given search space.

Note that the carrier indicator field value is the same as ServCellIndex

For the common search spaces, $Y_k$ is set to 0 for the two aggregation levels L=4 and L=8.

For the UE-specific search space $S_k^{(L)}$ at aggregation level L, the variable $Y_k$ is defined by $$Y_k = (A \cdot Y_{k-1}) \mod D$$

where $Y_{-1} = n_{RNTI} \neq 0$, A=39827, D=65537 and k=⌊n$_s$/2⌋, n$_s$ is the slot number within a radio frame.

The RNTI value used for $n_{RNTI}$ is defined in subclause 7.1 in downlink and subclause 8 in uplink.

According to the above-mentioned definition of the search space for a PDCCH, the UE-specific search space is not explicitly signaled but is defined implicitly by a function and a subframe number associated with a UE identity. In other words, the fact that a UE-specific search space is changed depending on a subframe number indicates that the UE-specific search space may be changed over time. Through the above, a problem (defined as a blocking problem) in which a predetermined UE is incapable of using a search space due to other UEs among UEs, may be overcome.

A UE is not scheduled in a subframe since all CCEs that the UE investigates are currently used by other scheduled UEs within the same subframe. However, since the search space is changed over time, this problem does not occur in a subsequent subframe. For example, although UE-specific search spaces of UE#1 and UE#2 partially overlap in a predetermined subframe, the overlap may be changed in a subsequent subframe since a UE-specific search space is different for each subframe.

According to the above-described definition of the search space for a PDCCH, a common search space is defined as a set of CCEs agreed in advance since a group of UEs or all UEs need to receive a PDCCH. In other words, the common search space is not changed depending on a UE identity, a subframe number, or the like. Although the common search space exists for transmission of various system messages, the common search space may be used for transmitting control information of an individual UE. Through the above, the common search space may be used as a solution for a phenomenon in which a UE is not scheduled due to lack of available resources in a UE-specific search space.

A search space is a set of candidate control channels formed by CCEs which a UE is supposed to attempt to decode, on a given aggregation level. There are various aggregation levels corresponding one, two, four, and eight CCEs, and a UE has multiple search spaces. In an LTE PDCCH, the number of PDCCH candidates that a UE needs to monitor (monitoring) in a search space defined on the basis of an aggregation level is defined in the table as below.

TABLE 1

| Search space $S_k^{(L)}$ | | | |
|---|---|---|---|
| Type | Aggregation level L | Size [in CCEs] | Number of PDCCH candidates M$^{(L)}$ |
| UE-specific | 1 | 6 | 6 |
|  | 2 | 12 | 6 |
|  | 4 | 8 | 2 |
|  | 8 | 16 | 2 |

TABLE 1-continued

| Search space $S_k^{(L)}$ | | | |
|---|---|---|---|
| Type | Aggregation level L | Size [in CCEs] | Number of PDCCH candidates M$^{(L)}$ |
| Common | 4 | 16 | 4 |
|  | 8 | 16 | 2 |

According to Table 1, in the case of a UE-specific search space, aggregation levels {1, 2, 4, 8} are supported, and in this instance, {6, 6, 2, 2} PDCCH candidates may be given, respectively. In the case of a common search space 302, aggregation levels {4, 8} are supported, and in this instance, {4, 2} PDCCH candidates may be given, respectively. The reason why the common search space supports only aggregation levels {4, 8} is to improve a coverage characteristic, since a system message generally needs to arrive at the edge of a cell.

DCI transmitted in the common search space is defined for a predetermined DCI format such as 0/1A/3/3A/1C corresponding to the purpose of power control or the like for a UE group or a system message. In the common search space, a DCI format having spatial multiplexing is not supported. A downlink DCI format which is supposed to be decoded in a UE-specific search space may be changed depending on a transmission mode configured for a corresponding UE. The transmission mode is configured via RRC signaling and thus, a subframe number is not accurately defined in association with whether the corresponding configuration is effective for the corresponding UE. Therefore, the UE always performs decoding with respect to DCI format 1A irrespective of a transmission mode, so as to operate not to lose communication.

Figure 3:
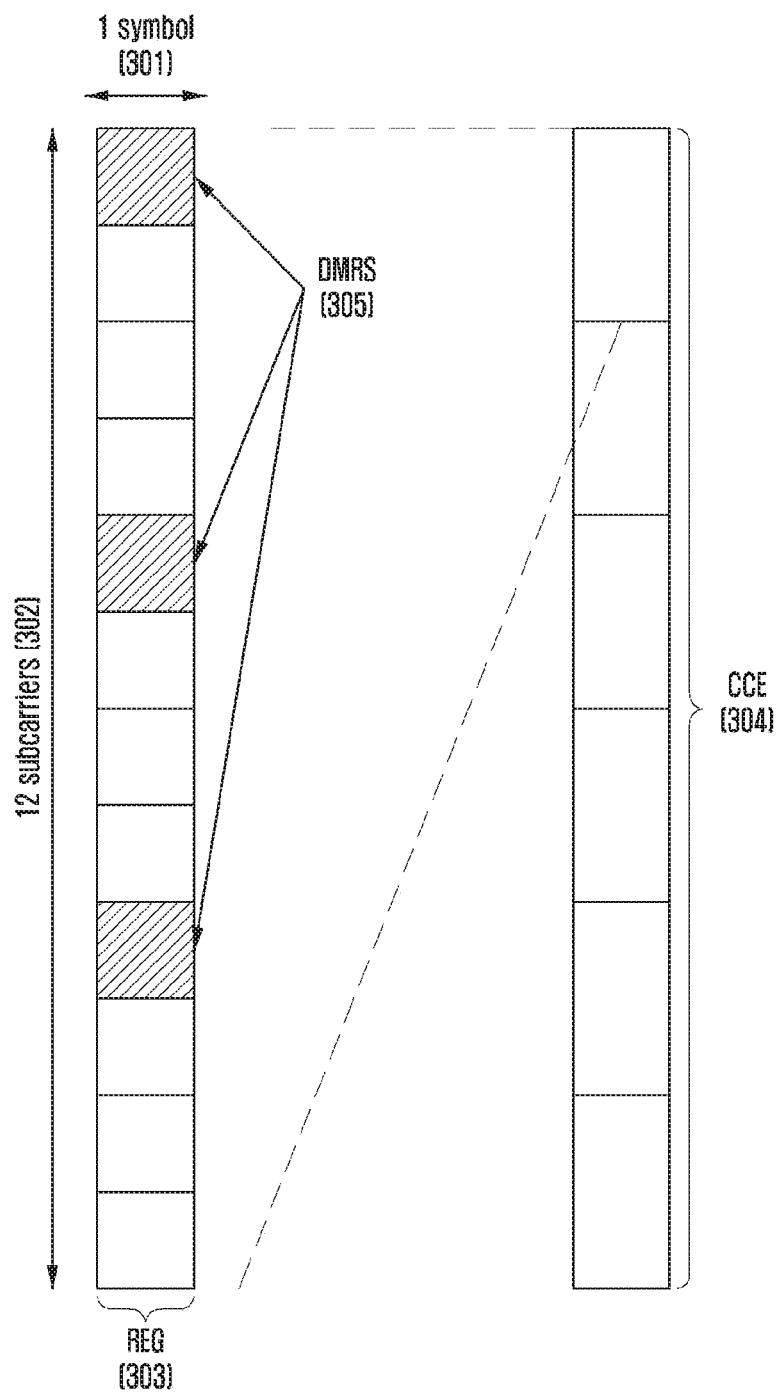
FIG. 3 is a diagram illustrating a transmission resource of a 5G downlink control channel.

FIG. 3 is a diagram illustrating an example of the basic unit of time and frequency resources configured for a downlink control channel usable in 5G. According to FIG. 3, the basic unit (REG) of time and frequency resources configured for a control channel includes 1 OFDM symbol 301 in the time axis and 12 subcarriers 302 in the frequency axis, that is, 1 RB. By assuming 1 OFDM symbol 301 as a time-axis basic unit when configuring the basic unit of a control channel, a data channel and a control channel may be time-multiplexed within a single subframe. By placing a control channel before a data channel, a processing time of a user may be reduced, and thus, a requirement associated with latency may be easily satisfied. The frequency-axis basic unit of a control channel is set to 1 RB 302, and thus, the frequency multiplexing between a control channel and a data channel may be effectively performed.

By connecting REGs 303 illustrated in FIG. 3, a control channel region may be configured in various sizes. For example, when the CCE 304 is a basic unit for allocation of a downlink control channel in 5G, 1 CCE 304 may include a plurality of REGs 303. A description will be provided with reference to the REG 304 of FIG. 3. If the REG 303 includes 12 REs and 1 CCE 304 includes 6 REGs 303, this indicates that 1 CCE 304 includes 72 REs. If a downlink control region is configured, the corresponding region includes a plurality of CCEs 304, and a predetermined downlink control channel may be transmitted by being mapped to a single CCE or multiple CCEs 304 in the control region, according to an aggregation level (AL). The CCEs 304 in the control region may be distinguished by numbers, and the numbers may be assigned according to a logical mapping scheme.

The basic unit of the downlink control channel of FIG. 3, that is, the REG 303, may include REs to which DCI is mapped and a region to which a demodulation reference signal (DMRS) 305, which is a reference signal for decoding the DCI, is mapped. As illustrated in FIG. 3, three DMRSs 305 may be transmitted within 1 REG 303.

Figure 4:
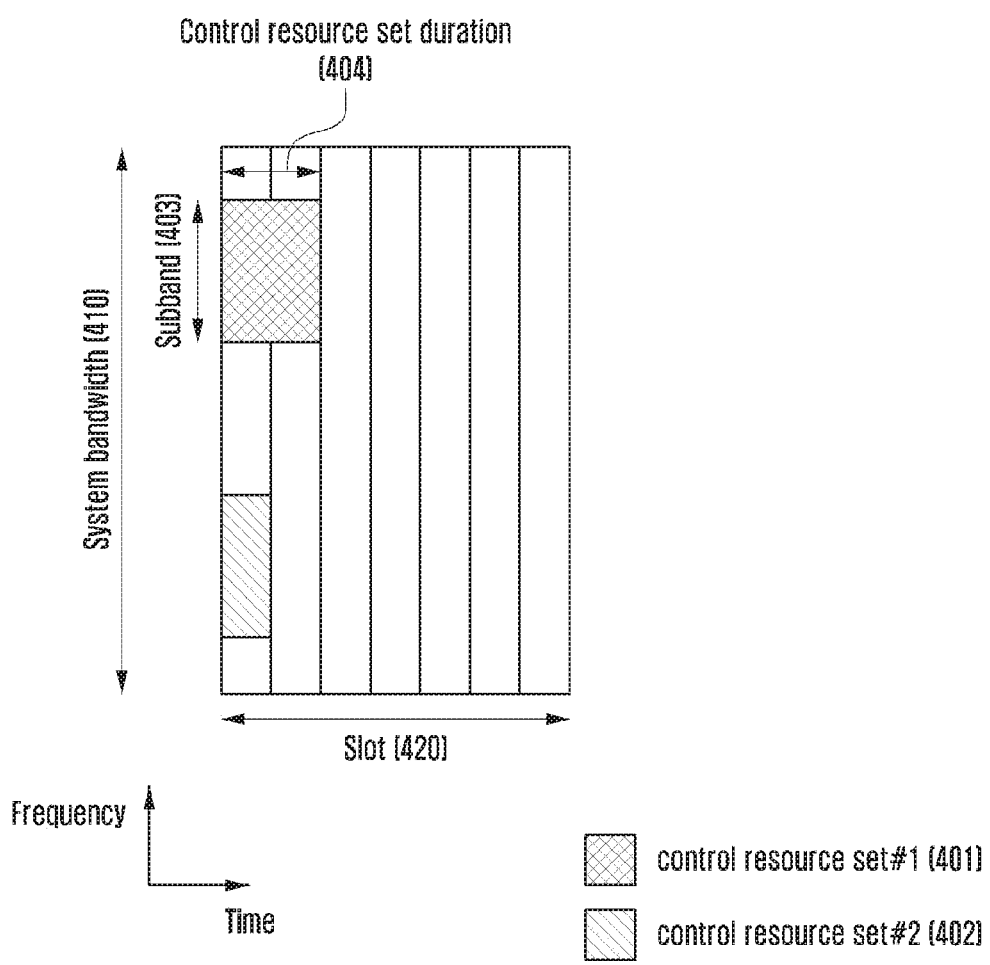
FIG. 4 is a diagram illustrating an example of configuration of a 5G downlink control region.

FIG. 4 is a diagram illustrating an example of a control region (a control resource set (CORESET)) in which a downlink control channel is transmitted in a 5G wireless communication system. In FIG. 4, it is assumed that two control regions (control resource set #1 401 and control resource set #2 402) are configured within a system bandwidth 410 in the frequency axis and 1 slot 420 in the time axis (e.g., an example of FIG. 4 assumes that 1 slot includes 7 OFDM symbols).

The control region 401 or 402 may be configured based on a predetermined subband 403 of the entire system bandwidth 410 in the frequency axis. The control region may be configured based on a single or multiple OFDM symbols, which may be defined as a control region length (control resource set duration 404), in the time axis. In the example of FIG. 4, the control resource set #1 401 is configured based on a control resource set duration of 2 symbols, and the control resource set #2 is configured based on a control resource set duration of 1 symbol.

The control region in 5G, as described above, may be configured via higher layer signaling (e.g., system information, master information block (MIB), radio resource control (RRC) signaling) from an eNB to a UE. Configuring a control region for a UE indicates providing information associated with the location of the control region, a subband, resource allocation of the control region, a control region length, and the like. For example, the following information may be included.

TABLE 2

| configuration information 1. | RB allocation information in frequency axis |
| configuration information 2. | control region start symbol |
| configuration information 3. | Control region symbol length |
| configuration information 4. | REG bundling size |
| configuration information 5. | Transmission mode (interleaved transmission scheme or Non-interleaved transmission scheme) |
| configuration information 6. | DMRS configuration information |
| configuration information 7. | search space type (common search space, group-common search space, UE-specific search space) |
| configuration information 8. | Monitoring period |
| others | |

In addition to the above-described configuration information, various information required for transmitting a downlink control channel may be configured for a UE.

As a resource mapping scheme of a 5G downlink control channel (e.g., a CCE-to-REG mapping scheme), a non-interleaving scheme and an interleaving scheme may be used. The non-interleaving mapping scheme indicates a mapping scheme that configures a single CCE with multiple contiguous REGs. The interleaving mapping scheme indicates a mapping scheme that configures a single CCE with multiple non-contiguous REGs.

A preferred mapping scheme may be different depending on a downlink control channel transmission scheme. For example, a transmit diversity transmission scheme may be used for a PDCCH in order to increase reception performance. In order to maximize a frequency diversity, the interleaving mapping scheme may be applied. Alternatively, if a UE-specific beamforming is used for PDCCH transmission, the non-interleaving mapping scheme may be used in order to maximize a beamforming gain in a predetermined subband in which a PDCCH is transmitted.

Hereinafter, a bandwidth part configuration method considered in a 5G communication system will be described.

Figure 5:
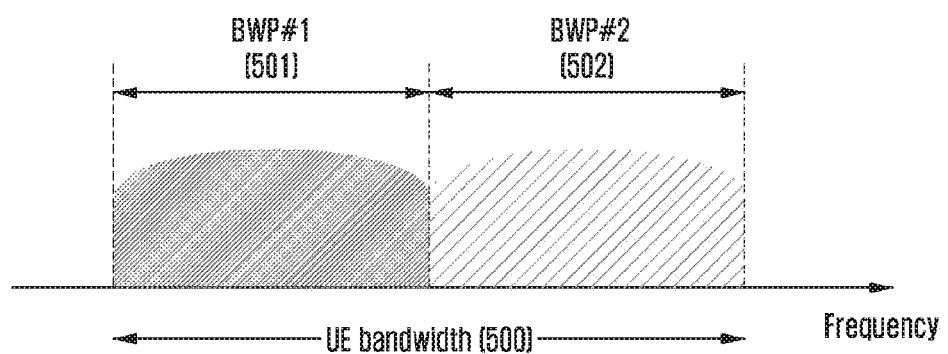
FIG. 5 is a diagram illustrating an example of configuration of a bandwidth part in 5G.

FIG. 5 is a diagram illustrating an example of configuration of a bandwidth part in a 5G communication system. FIG. 5 shows an example in which two bandwidth parts, that is, bandwidth part #1 501 and bandwidth part #2, are configured in a UE bandwidth 500. An eNB may configure a single or multiple bandwidth parts for a UE, and may set the following information for each bandwidth part.

TABLE 3

| Configuration information 1. | Bandwidth of bandwidth part (number of PRBs in bandwidth part) |
| Configuration information 2. | Location of frequency in bandwidth part (offset value relative to reference point, and the reference point is, for example, center frequency of carrier, synchronization signal, synchronization signal raster, or the like) |
| Configuration information 3. | Numerology of bandwidth part (e.g., subcarrier spacing, cyclic prefix (CP) length, or the like) |
| Others | |

In addition to the above-described configuration information, various parameters related to a bandwidth part may be set for the UE. The information may be transferred from the eNB to the UE via higher layer signaling, for example, RRC signaling. At least one bandwidth part among the configured one or multiple bandwidth parts may be activated (activation). Whether to activate the configured bandwidth part may be transferred from an eNB to a UE semi-statically via RRC signaling, or may be transferred dynamically via a medium access control (MAC) control element (CE) or DCI.

Bandwidth part configuration supported in 5G may be used for various purposes.

For example, if a bandwidth supported by a UE is smaller than a system bandwidth, bandwidth part configuration may be used. For example, if the frequency location of a bandwidth part (configuration information 2) in Table 3 is configured for a UE, the UE is capable of transmitting or receiving data at a predetermined frequency location in the system bandwidth.

As another example, to support different numerologies, an eNB may configure multiple bandwidth parts for a UE. For example, in order to support data transmission or reception based on both a subcarrier spacing of 15 kHz and a subcarrier spacing of 30 kHz for a UE, the two bandwidth parts may be configured based on the subcarrier spacing of 15 kHz and the subcarrier spacing of 30 kHz, respectively. The different bandwidth parts may be frequency division multiplexed (frequency division multiplexing), and if data transmission or reception based on a predetermined subcarrier spacing is needed, a bandwidth part configured based on the corresponding subcarrier spacing may be activated.

As another example, an eNB may configure bandwidth parts having different bandwidths for a UE for the purpose of reducing power consumption of the UE. For example, when the UE supports a significantly wide bandwidth, that is, a bandwidth of 100 MHz, and always transmits or receives data using the corresponding bandwidth, a significantly large amount of power consumption may result. Particularly, in the state in which traffic does not exist, monitoring a downlink control channel in a large bandwidth of 100 MHz, which is unnecessary, may be inefficient from the perspective of power consumption. Accordingly, in order to reduce the power consumption of the UE, the eNB may configure a bandwidth part of a relatively smaller bandwidth, for example, a bandwidth part of 20 MHz, for the UE. In the state in which traffic does not exist, the UE may perform monitoring in the bandwidth part of 20 MHz, and if data is generated, the UE may transmit or receive the data through the bandwidth part of 100 MHz according to an instruction form the eNB.

If the UE changes a bandwidth part, a predetermined period of time may be spent on changing the bandwidth part. This is referred to as a switching time or a retuning time. Hereinafter, this will be referred to as a retuning time in the description of the disclosure.

Figure 6:
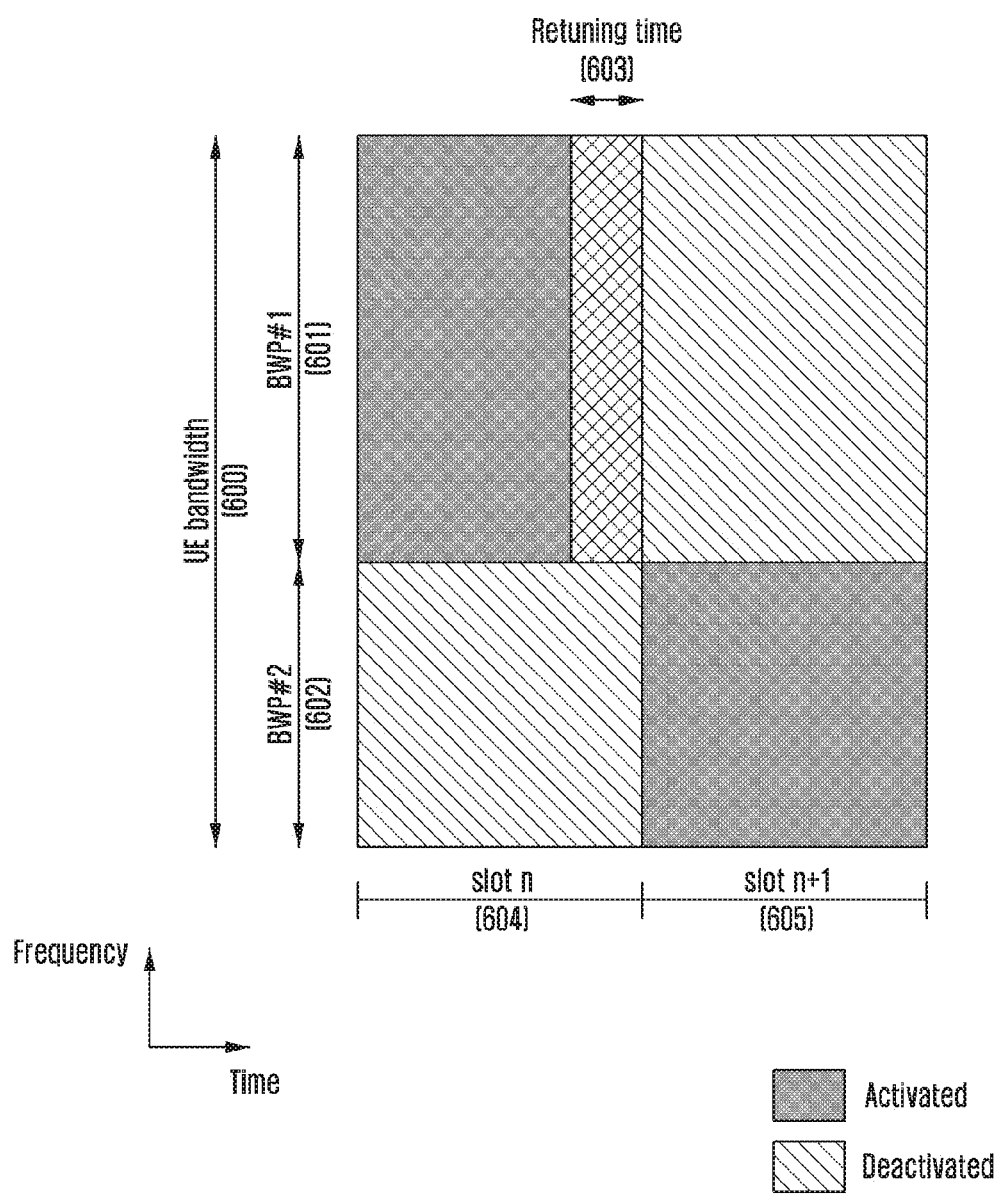
FIG. 6 is a diagram illustrating an example of configuration and changing of a bandwidth part in 5G.

FIG. 6 is a diagram illustrating an example of changing a bandwidth part. FIG. 6 illustrates an example in which an eNB configures two bandwidth parts, bandwidth part #1 601 and bandwidth part #2 602, within a UE bandwidth 600. In an $n^{th}$ slot 604, UE bandwidth part #1 601 is activated for a UE. The UE activates bandwidth part #2 602 in an $(n+1)^{th}$ slot 605 according to a command to activate bandwidth part #2 which is provided from an eNB to the UE via various methods. In this instance, a retuning time 603 may be needed in order to change bandwidth part #1 601 to bandwidth part #2 602.

The retuning time 603 may be changed depending on a bandwidth change scenario. For example, in the case in which a bandwidth part is changed, if only a bandwidth is adjusted without changing the center frequency, that is, changing a radio frequency (RF), a relatively shorter retuning time 603 may be needed. Conversely, in the case in which a bandwidth is changed, the center frequency is also changed in addition to the change of the bandwidth, a relatively longer retuning time 603 may be needed. Also, in the case in which a bandwidth part having a relatively significantly smaller bandwidth is changed to a bandwidth part having a relatively significantly larger bandwidth, a relatively longer retuning time 603 may be needed according to adaptive gain control (AGC).

The retuning time may be different for each UE, depending on implementation performance, that is, capability, of a UE. The UE may report its capability associated with the retuning time 603 to the eNB. For example, the UE may report that K symbols are spent during the retuning time 603, or may report that a K time (ms or μs) is spent. If a symbol unit is used for reporting the retuning time, a reference numerology may be used. For example, the UE may report that K symbols corresponding to a subcarrier spacing of 15 kHz are spent during the retuning time 603.

Subsequently, a slot format considered in the 5G communication system will be described.

In 5G, 1 slot 701 includes 14 OFDM symbols 702. Each symbol in a slot may be used one of a downlink 703, an uplink 705, and an unknown 704. The fact that a symbol is used as the downlink 703 indicates that transmission is performed from an eNB to a UE. That is, the eNB performs transmission and the UE performs reception. The fact that a symbol is used as the uplink 705 indicates that transmission is performed from a UE to an eNB. That is, the UE performs transmission and the eNB performs reception. If a symbol is the unknown 704, any transmission or reception between an eNB and a UE does not occur in the corresponding symbol. In this instance, the unknown symbol 704 may be overridden by another piece of downlink control information (DCI). In this instance, the unknown symbol 704 may be used for a predetermined purpose according to information included in the indicator of the DCI.

A single slot may include as a combination of symbols corresponding to the downlink 703, uplink 705, and unknown 704, and a predetermined combined form is referred to as a slot format. That is, each of the 14 symbols in a slot may have a possibility of being one of the three, the downlink 703, uplink 705, and unknown 704. Accordingly, the number of possible slot formats may be $3^{14}$.

Figure 7:
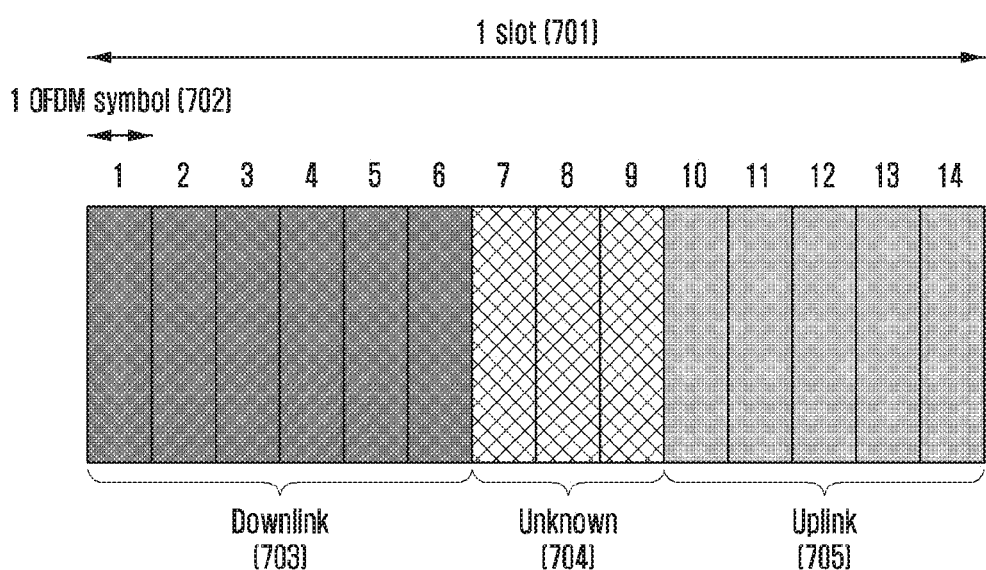
FIG. 7 is a diagram illustrating an example of a slot format in 5G.

FIG. 7 is a diagram illustrating one of the possible slot formats. FIG. 7 illustrates an example in which $1^{st}$ to $6^{th}$ symbols are configured as the downlink symbols 703, $7^{th}$ to $9^{th}$ symbols are configured as the unknown symbols 704, and $10^{th}$ to $14^{th}$ symbols are configured as the uplink symbols 705.

In some case, the slot format of a slot may be reported from an eNB to a UE via a slot format indicator (SFI). An SFI may be transmitted via a group-common physical downlink control channel (PDCCH). The group-common PDCCH may transmit a single or multiple SFIs, and the multiple SFIs may indicate the slot formats of multiple slots that follow after the multiple SFIs, respectively.

An eNB may configure a UE to monitor a group-common PDCCH, and the UE configured to monitor a group-common PDCCH may monitor a group-common PDCCH, and may obtain an SFI. The UE may obtain the slot format of a predetermined slot or the slot formats of slots from the obtained SFI, and may determine each symbol as a symbol corresponding to one of the downlink 703, uplink 705, and unknown 704 according to the slot format.

In 5G, an eNB is capable of configuring a single bandwidth part or a plurality of bandwidth parts for a UE, and one of the bandwidth parts configured for the UE may be activated. If an explicit indication exists or a predetermined time condition is satisfied, a bandwidth part may be changed. To this end, a predetermined period of time may be expended. The predetermined period of time may be different depending on the capacity of a UE and an environment associated with bandwidth part change.

If the currently activated bandwidth part is different from a bandwidth part for transmitting or receiving a control channel, a UE may automatically activate the bandwidth part for transmitting or receiving a control channel according to a predetermined configuration. In this instance, a part of a signal which was transmitted or received in the bandwidth part which was activated may be dropped. Alternatively, the signal which was transmitted or received in the bandwidth part that was activated is maintained as it was, and the transmission or reception of the control channel may be skipped.

The disclosure proposes various embodiments associated with a method and a rule for dropping a signal which was transmitted or received in a bandwidth part before changing the bandwidth part or a method and a rule for skipping a signal to be transmitted or received in a bandwidth part after bandwidth part change, according to the situation of a transmission or reception of an uplink control channel and a data channel.

Hereinafter, embodiments of the disclosure will be described in detail with reference to the accompanying drawings. Although an embodiment of the disclosure is described with reference to an LTE or LTE-A system, the embodiment of the disclosure may be applicable to other communication systems having a similar technical background or a similar channel form. For example, the 5G mobile communication technology (5G, new ratio, or NR) developed after LTE-A may be included. Therefore, embodiments of the disclosure may be modified without departing from the scope of the disclosure, and may be applied to other communication systems, based on the determination by those skilled in the art.

Embodiment 1

Figure 8:
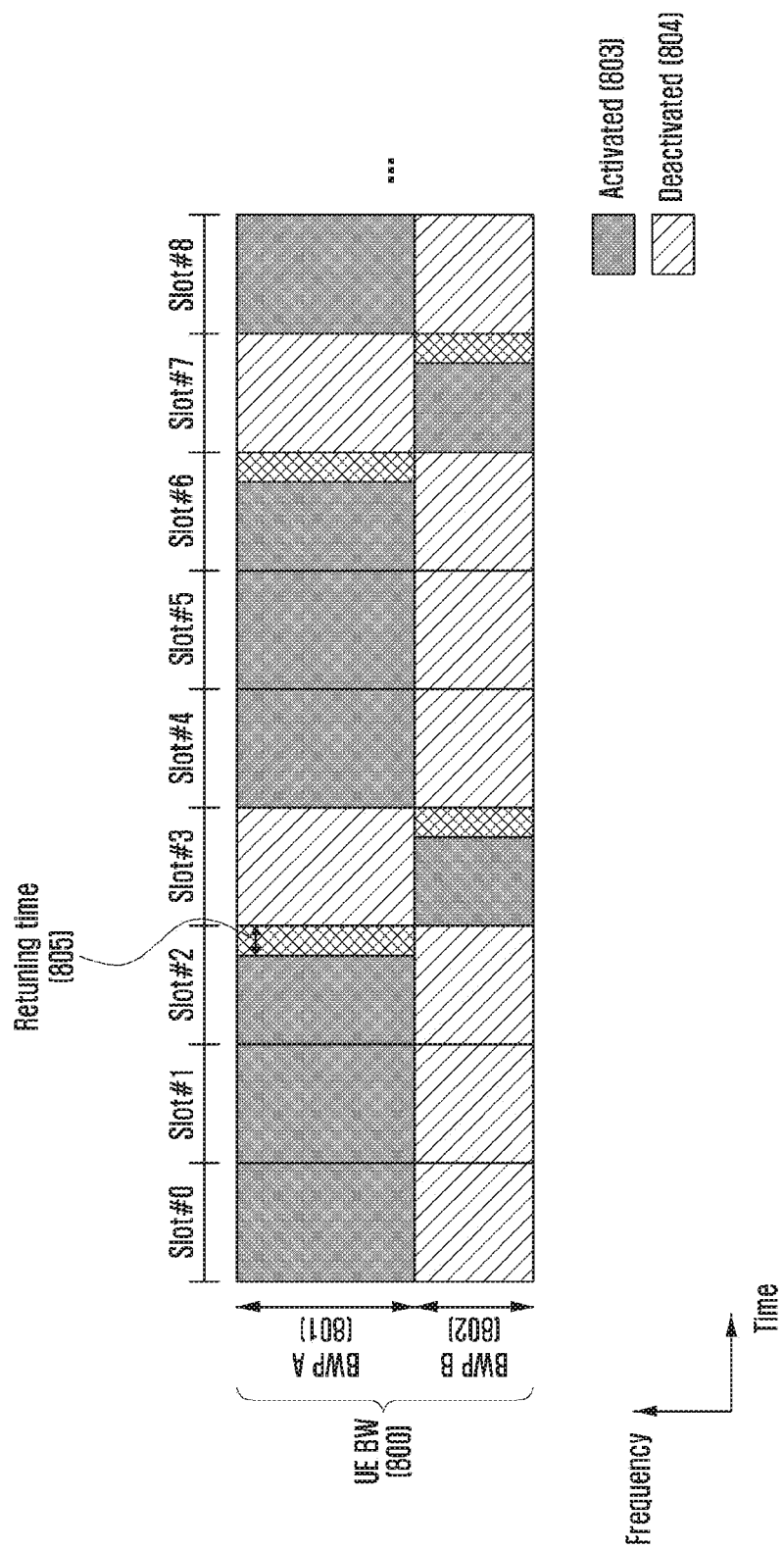
FIG. 8 is a diagram illustrating an example of bandwidth part change which is considered in a first embodiment of the disclosure.

FIG. 8 is a diagram illustrating an example of changing a bandwidth part, which is considered in the disclosure.

In the example of FIG. 8, a UE bandwidth 800 is configured with two bandwidth parts, that is, bandwidth part A 801 and bandwidth part B 802. One of the configured bandwidth parts may be activated 803 at a predetermined time, and the bandwidth parts remaining after excluding the activated bandwidth part may be deactivated 804. Bandwidth part A 801 of FIG. 8 is activated 803 in slot #0, slot #1, slot #2, slot #4, slot #5, slot #6, and slot #8, and bandwidth part B 802 is activated 803 in slot #3 and slot #7.

An activated bandwidth of the UE is different over time, and thus, changing a bandwidth part may be performed in a predetermined slot.

The bandwidth part change may be performed according to various configurations and indications. For example, the following cases may be included.

If an eNB transmits an explicit bandwidth part change indicator to a UE, and the UE successfully receives the corresponding indicator, the UE may change a bandwidth according to the indication from the eNB. The explicit indicator may be transferred from the eNB to the UE via, for example, RRC signaling, MAC CE signaling, or DCI signaling.

If an eNB transmits an implicit bandwidth part change indicator to a UE, and the UE successfully receives the corresponding indicator, the UE may change a bandwidth according to the indication by the eNB. Via the implicit bandwidth change indicator, the eNB may configure the UE, for example, to perform operation A in bandwidth part A. This may correspond to the case in which the UE changes a bandwidth in order to activate the bandwidth part A and to perform operation A according to an explicit indicator that indicates performing operation A. For example, the operation A may correspond to PUCCH transmission (aperiodic channel state information (C SI) or channel quality information (CQI) reporting, a periodic sounding reference signal (SRS) transmission, or the like.

An eNB may implicitly or explicitly configure periodic activation of a predetermined bandwidth part for a UE.

In the case of implicit configuration, the eNB may configure the UE to periodically perform operation A in predetermined bandwidth part A. The operation A may correspond, for example, physical downlink control channel (PDCCH) monitoring (e.g., monitoring a common search space or group-common search space), PUCCH transmission (e.g., transmission of hybrid automatic retransmission request (HARD) acknowledgement (ACK)/negative acknowledgement (NACK) associated with a PDSCH, or periodic CSI or CQI reporting), periodic SRS transmission, radio resource measurement (RRM), or the like. The UE may activate the bandwidth part A in order to perform operation A.

In the case of explicit configuration, an eNB may configure a UE to periodically activate bandwidth part A for a predetermined reason. For example, the bandwidth part A may correspond to a default (default or primary) bandwidth part, and the periodic activation of the bandwidth part A is configured for the purpose of fallback.

The UE may activate the bandwidth part A according to the implicit/explicit configuration. If the bandwidth part B is in an activated state at the point in time before the point in time at which the bandwidth part A needs to be activated, the UE may change the bandwidth part B to the bandwidth part A. That is, the UE may deactivate the bandwidth part B and activate the bandwidth part A. If the bandwidth part A is in an activated state even at the point in time before the point in time at which the bandwidth part A needs to be activated, the UE may perform transmission or reception in the bandwidth part A without changing a bandwidth part.

The eNB may set a timer for the predetermined bandwidth part A for the UE, and may perform configuration so as to return to the other bandwidth part B after the set time. The UE may change a bandwidth part according to the configuration by the eNB. For example, if the bandwidth part A is currently activated, the UE may change a bandwidth part in order to activate the bandwidth part B after a period of time associated with the set timer. If the bandwidth part B is activated currently, the UE may maintain the bandwidth part B as it is unless a predetermined indication from the eNB exists. For example, the bandwidth part B may correspond to the default bandwidth part, and it is secured that the bandwidth part B is surely activated after a predetermined period of time for the purpose of fallback.

For the various above-mentioned reasons, bandwidth part change may be performed. In the example of FIG. 8, it is illustrated that bandwidth part change occurs in slot#2, slot#3, slot#6, and slot#7.

More particularly, the bandwidth part A 801 is changed to the bandwidth part B 802 in slot #2. The bandwidth part B 802 is changed to the bandwidth part A 801 in slot #3. The bandwidth part A 801 is changed to the bandwidth part B 802 in slot #6. The bandwidth part B 802 is changed to the bandwidth part A 801 in slot #7. When a bandwidth part is changed, a retuning time 805 may be needed. The retuning time 805 may be different depending on the capacity of a UE. The UE may report its capacity associated with the retuning time 805 to the eNB. Hereinafter, the retuning time 805 is defined as K in the description of the disclosure.

During the retuning time 805, the UE may not perform transmission or reception of a signal. Accordingly, the UE may drop a part of a signal that the UE desires to transmit or receive in a bandwidth part before changing the bandwidth part, or may skip a part of a signal that the UE desires to transmit or receive in a bandwidth part after changing a bandwidth part. Whether to drop or skip a signal may be different depending on the type of signal. Hereinafter, a drop/skip operation depending on the type of signal that a UE desires to transmit or receive in a bandwidth part before bandwidth part changing, and the type of signal that the UE desires to transmit or receive in a bandwidth part after bandwidth part changing, will be described according to various embodiments.

Hereinafter, for ease of description of an embodiment of the disclosure, the following definitions will be used.

A bandwidth part before changing: bandwidth part A

A signal supposed to be transmitted or received in a bandwidth part before changing (bandwidth part A): signal A A bandwidth part after changing: bandwidth part B A signal supposed to be transmitted or received in a bandwidth part after changing (bandwidth part B): signal B A retuning time required for changing bandwidth part A to bandwidth part B: K Embodiment 1-1

If the signal A corresponds to a PDSCH or PUSCH, and the signal B corresponds to a PDCCH or PUCCH, an eNB and a UE may not perform transmission or reception but drop the last N symbols of the signal A. In this instance, the length of dropped N symbols may be greater than or equal to a retuning time K.

Since the UE does not perform transmission or reception of the signal A in the bandwidth part A, the UE may secure the retuning time K. Accordingly, the UE may change the bandwidth part A to the bandwidth part B. After changing the bandwidth part, the UE may transmit or receive the signal B in the bandwidth part B.

The fact that the signal B corresponds to a PDCCH may generally indicate an operation in which the UE monitors a PDCCUH. Particularly, this may correspond to the following cases.

- The operation may correspond to an operation of monitoring a predetermined search space B, and the search space B may correspond to, for example, a common search space or a group-common search space. Specifically, the search space B may be one of a common search space in which DCI scrambled with system information (SI)-RNTI is transmitted, a common search space in which DCI scrambled with a random access (RA)-RNTI is transmitted, or a common search space in which DCI scrambled with a paging (P)-RNTI, or a combination thereof.
- The operation may correspond to an operation of monitoring a predetermined DCI format B, and the DCI format B may correspond to, for example, one or more from among DCI scrambled with an SI-RNTI, DCI scrambled with an RA-RNTI, and DCI scrambled with a P-RNTI.

The fact that the signal B corresponds to a PUCCH generally indicates an operation in which the UE transmits PUCCH type A (or a long PUCCH), and particularly, the operation may correspond to the following cases.

- A periodic PUCCH resource may be configured for the UE for periodically reporting CSI (or CQI) to the eNB, and the UE may report CSI using the corresponding PUCCH resource. That is the signal B may correspond to PUCCH transmission for periodically reporting CSI or CQI.
- A PUCCH resource may be configured for the UE for transmitting a HARQ ACK/NACK associated with a PDSCH, and the UE may transmit an ACK/NACK using the corresponding PUCCH resource. That is the signal B may correspond to PUCCH transmission for periodically reporting CSI or CQI.

According to embodiment 1-1, transmission or reception of an uplink/downlink control channel may be secured by submitting to the fact that transmission or reception of a part of an uplink/downlink data channel is not allowed. Although the part of the uplink/downlink data channel is not transmitted or received, if the UE has a capability of restoring the part of the uplink/downlink data channel which is not transmitted or received, via error correction code such as channel coding, transmission or reception of both the uplink/downlink data channel and the uplink/downlink control channel may be secured. For example, if the transmission or reception length M of the uplink/downlink data channel is relatively longer than the retuning time K, even though a part of the data channel is dropped, the corresponding data channel may be successfully decoded. Therefore, embodiment 1-1 may be dramatically effective in the case of M>>K.

Embodiment 1-2

If the signal A corresponds to a PDSCH or PUSCH, and the signal B corresponds to a PDCCH or PUCCH, an eNB and a UE may not perform transmission or reception but drop the entirety of the signal A. The UE may change the bandwidth part A to the bandwidth part B, and may perform transmission or reception of the signal B in the bandwidth part B.

According to embodiment 1-2, transmission or reception of an uplink/downlink control channel may be secured by aborting the transmission or reception of an uplink/downlink data channel. For example, when compared to the transmission or reception length M of the uplink/downlink data channel, if the returning time K is equal to M or has an insignificant difference from M, that is, if M≥K, it is difficult to expect that the data channel is successfully decoded while the retuning time is secured. In this instance, it may be better to abort the transmission or reception of the corresponding data channel.

Embodiment 1-3

If the signal A corresponds to a predetermined type of PDSCH or PUSCH, and the signal B corresponds to a PDCCH or PUCCH, an eNB and a UE may perform transmission or reception of the entirety of the signal A, but skip transmission or reception of the signal B. Also, the UE may not change the bandwidth part A to the bandwidth part B.

The fact that the signal A corresponds to a predetermined type of PDSCH or PUSCH may include the following cases.
- The PDSCH or PUSCH corresponds to traffic for URLLC.
- The PDSCH or PUSCH corresponds to a non-slot scheduling-based mapping type.
- The PDSCH or PUSCH corresponds to a numerology of a long subcarrier spacing (e.g., a subcarrier spacing of 60 kHz in a frequency band less than or equal to 6 GHz or a subcarrier spacing of 120 kHz/240 kHz in a frequency band greater than or equal to 6 GHz).

According to embodiment 1-3, transmission or reception of an uplink/downlink data channel having high priority or requirement is secured, but transmission and reception of the entirety or a part of the uplink/downlink control channel may be aborted. For example, since URLLC requires significantly high reliability and significantly low latency, it is preferable to put URLLC before transmission or reception of the uplink/downlink control channel.

Embodiment 1-4

If the signal A corresponds to a PDSCH or PUSCH, and the signal B corresponds to a predetermined type of PUCCH, an eNB and a UE may not perform transmission or reception but drop the front N symbols of the signal B. In this instance, the length of dropped N symbols may be greater than or equal to the retuning time K.

The fact that the signal B is a predetermined type of PUCCH may correspond to the case that satisfies the following conditions.
- Condition 1) PUCCH type A having a length greater than or equal to L(>>K) (or a PUCCH having the same length)

Condition 2) a PUCCH to be used for reporting CSI or CQI

If the signal B satisfies condition 1 or condition 2, or satisfies both condition 1 and condition 2, embodiment 1-4 may be applied.

According to embodiment 1-4, by aborting transmission or reception of a part of an uplink control channel which has a relatively lower priority, transmission or reception of the entire uplink/downlink data channel may be secured.

Embodiment 1-5

If the signal A corresponds to a PUCCH, and the signal B corresponds to a PDCCH, an operation may be performed, which is different depending on the transmission length of the signal A PUCCH.

[Operation 1]

If the signal A corresponds to PUCCH type A having a length greater than or equal to a predetermined threshold (L) (or a PUCCH having the same length), an eNB and a UE may not transmit but drop the last N symbols of the signal A. In this instance, the length of dropped N symbols may be greater than or equal to the retuning time K. Since the UE does not perform transmission or reception of the signal A in the bandwidth part A, the UE may secure the retuning time K. Accordingly, the UE may change the bandwidth part A to the bandwidth part B. After changing the bandwidth part, the UE may monitor the signal B in the bandwidth part B.

[Operation 2]

If the signal B corresponds to PUCCH type A having a length less than or equal to a predetermined threshold (L) (or a PUCCH having the same length), the eNB and the UE may perform transmission or reception of the entire signal A, and may skip the signal B. The UE may not change a bandwidth, and may skip monitoring the signal B in the bandwidth part B.

The threshold may be a length that satisfies L>>K.

According to embodiment 1-4, by determining priorities of the transmission of the uplink control channel and monitoring of the downlink control channel differently depending on the length of the uplink control channel, effective operation may be performed.

Embodiment 1-5-1

If the signal A corresponds to a PUCCH, and the signal B corresponds to a PDCCH, the following operation may be performed depending on the transmission length of the signal A PUCCH

[Operation 3]

If the signal A corresponds to PUCCH type A having a length greater than or equal to a predetermined threshold (L) (or a PUCCH having the same length), or if the signal A is configured to perform frequency hopping, an eNB and a UE does not transmit or receive, but drop a second frequency-hopped PUCCH of the signal A. Since the UE does not perform transmission of a part of the signal A in the bandwidth part A, the UE may secure the retuning time K. Accordingly, the UE may change the bandwidth part A to the bandwidth part B. After changing the bandwidth part, the UE may monitor the signal B in the bandwidth part B.

Embodiment 1-6

If the signal A corresponds to a PUCCH, and the signal B corresponds to a PDCCH, an operation may be performed, which is different depending on a UCI delivered via the signal A PUCCH.

If the signal A corresponds to a PUCCH used for reporting CSI or CQI, an eNB and a UE may not transmit or receive, but drop the entire signal A. The UE may change the bandwidth part A to the bandwidth part B, and may perform reception (monitoring) of the signal B in the bandwidth part B.

If the signal A is a PUCCH used for transmitting a HARQ ACK/NACK associated with a PDSCH, the eNB and the UE may perform transmission or reception of the entirety of the signal A, and the UE may skip monitoring of the signal B. Alternatively, the UE may not change the bandwidth part A to the bandwidth part B.

According to embodiment 1-6, by determining priorities of the transmission of the uplink control channel and monitoring of the downlink control channel differently depending on the purpose of transmission of the uplink control channel, effective operation may be performed.

Embodiment 1-7

If the signal A corresponds to an SRS, and the signal B corresponds to a PDCCH or PUCCH, an eNB and a UE may not perform transmission or reception but drop the entirety of the signal A. The UE may change the bandwidth part A to the bandwidth part B, and may perform transmission or reception of the signal B in the bandwidth part B.

According to embodiment 1-7, transmission or reception of an uplink/downlink control channel may be secured preferentially by aborting transmission or reception of an SRS.

Embodiment 2

Embodiment 2 of the disclosure provides a method of performing interleaving differently depending on DMRS configuration information when transmitting a downlink control channel in a 5G wireless communication system.

The minimum transmission unit of a PDCCH in the 5G wireless communication system is a CCE, and a single CCE includes a total of 6 REGs. In order to increase channel estimation performance, multiple REGs may configure a single REG bundle, and the REGs in the single REG bundle may be allocated to be always adjacent to each other in time and frequency resources, when resource allocation is performed. That is, the REG bundle is always localized.

In the case of a distributed-type PDCCH, a single CCE is mapped to be distributed in units of REG bundles in time and frequency resources in a control region, which may be performed on the basis of a predetermined interleaving function (or a distributed mapping method). The size of the REG bundle may be configured by an eNB for a UE via higher layer signaling.

Figure 9:
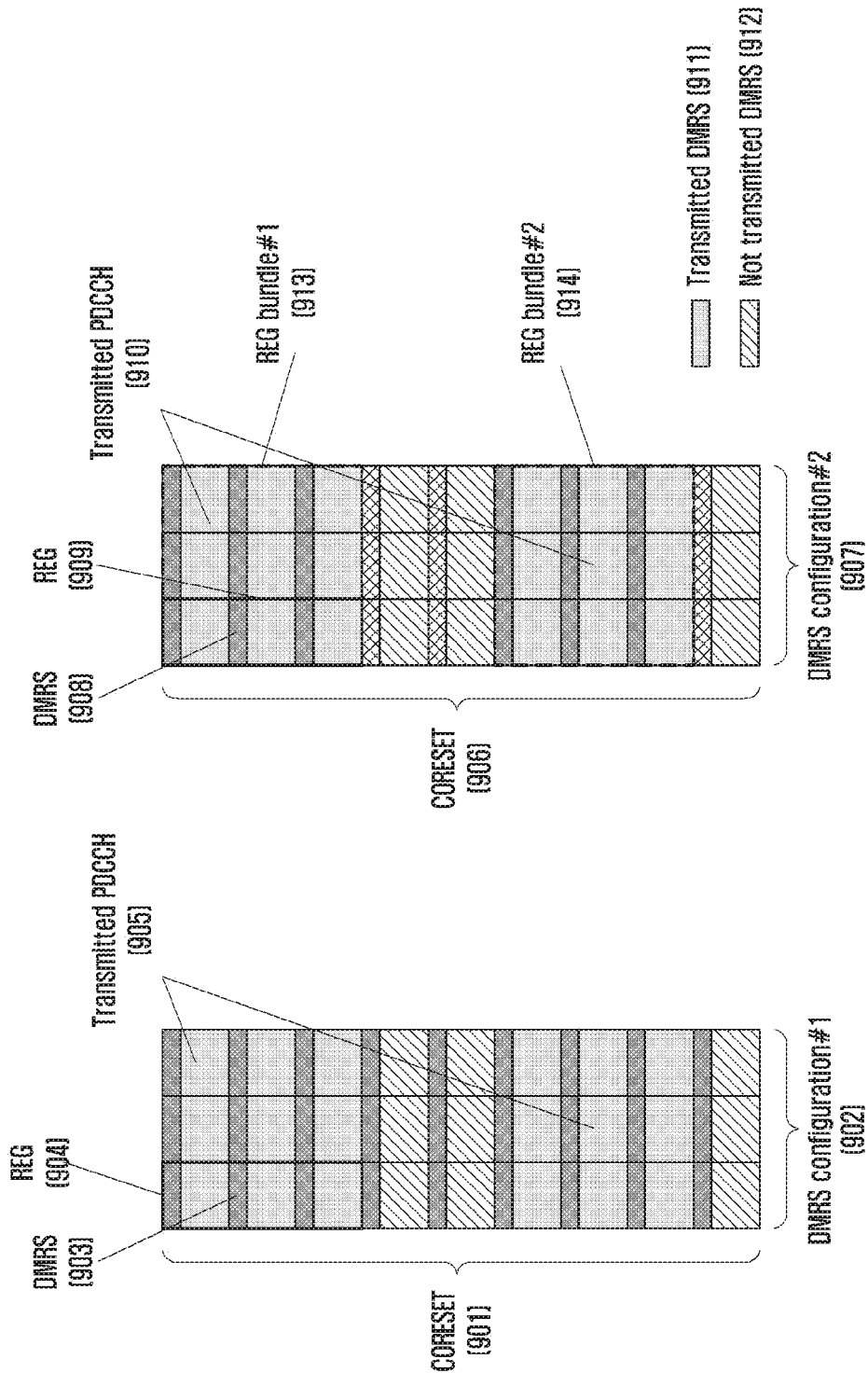
FIG. 9 is a diagram illustrating a method of configuring a DMRS of a 5G downlink control channel.

FIG. 9 is a diagram illustrating an example of a DMRS configuration associated with a downlink control channel in a 5G wireless communication system.

In 5G, a control region may be configured according to one of the following two configurations.

[DMRS configuration #1]

The fact that a control region is configured according to DMRS configuration #1 indicates that a DMRS, to which the same precoding is applied for all contiguous RBs in the control region, is transmitted by being mapped to all REGs in the corresponding control region.

In the example of FIG. 9, a control region 901 is configured according to DMRS configuration #1 902. A DMRS 903 may be transmitted in all REGs 904 within the control region 901. In this instance, the DMRS 903 may be transmitted in an REG 904 to which a transmitted PDCCH 904 is not mapped. Also, the same precoding may be applied to the all transmitted DMRSs 903.

A UE, which monitors the control region 901 configured based on DMRS configuration #1 902, assumes that the DMRS 903, to which the same precoding is applied, is transmitted in all REGs 904 in the control region 901, and performs channel estimation with respect to the corresponding control region 901, and may perform blind decoding with respect to the PDCCH 905 on the basis of the estimated channel information.

[DMRS configuration #2]

The fact that a control region is configured according to DMRS configuration #2 may indicate that a DMRS, to which the same precoding is applied in units of predetermined REG bundles, is transmitted by being mapped to an REG in which a PDCCH is actually transmitted.

In the example of FIG. 9, a control region 906 is configured according to DMRS configuration #2 907. A DMRS 908 may be transmitted in an REG 909 in which a PDCCH 901 is actually transmitted in the control region 906. Therefore, a DMRS 911 that is actually transmitted and a DMRS 912 that is not transmitted may exist in the control region 906, depending on whether the PDCCH 910 is transmitted. Also, the same precoding is applied to the transmitted DMRS 911 within a REG bundle. For example, the single transmitted PDCCH 910 of FIG. 9 includes two REG bundles, that is, REG bundle #1 913 and REG bundle #2 914, the same precoding is applied to the DMRSs 911 transmitted in the REG bundle #1 913 and the same precoding is applied to the DMRSs 911 transmitted in the bundle #2 914. The size of an REG bundle may be configured by an eNB for a UE as a part of the configuration of the control region 906.

A UE, which monitors the control region 906 configured based on DMRS configuration #2 907, may assume that DMRSs, to which the same precoding is applied in units of set REG bundles, are transmitted, may perform channel estimation, and may perform blind decoding of the PDCCH 910 on the basis of the estimated channel information.

According to Embodiment 2, an interleaving operation in association with a distributed downlink control channel may be controlled differently according to a DMRS configuration.

Particularly, control may be performed as follows.

[Operation 1]

If the DMRS configuration of a control region is on the basis of the defined DMRS configuration #1, an operation of interleaving a distributed PDCCH transmitted in the corresponding control region may be performed in units of REGs. That is, the resources in the entire control region are indexed in units of REGs, which may be input as an input value of an interleaving function. The output value of the interleaving function may be an interleaved REG index.

[Operation 2]

If the DMRS configuration of a control region is on the basis of the defined DMRS configuration #2, an operation of interleaving a distributed PDCCH transmitted in the corresponding control region may be performed in units of REG bundles. That is, the resources in the entire control region are indexed in units of REG bundles, which may be input as an input value of an interleaving function. The output value of the interleaving function may be an interleaved REG bundle index. In this instance, an REG bundle size may be based on a set value which an eNB informs a UE of via higher layer signaling.

Figure 10:
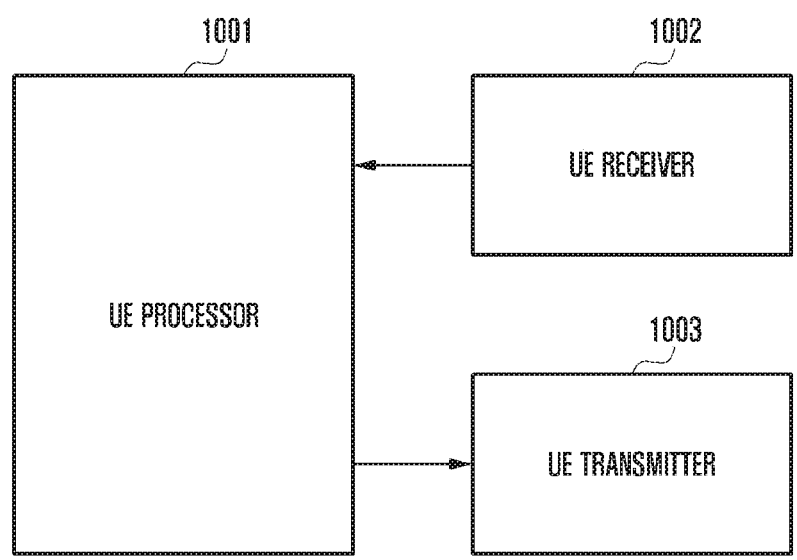
FIG. 10 is a block diagram illustrating the internal structure of a user equipment (UE) according to an embodiment.
Figure 11:
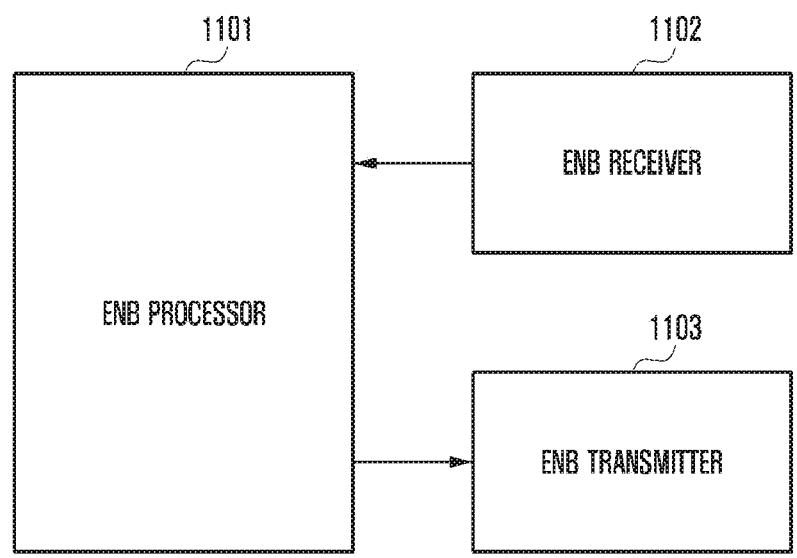
FIG. 11 is a block diagram of the internal structure of an evolved NodeB (eNB) according to an embodiment of the disclosure.

In order to implement the embodiments of the disclosure, the transmitters, the receivers, the controllers of a UE and an eNB are illustrated in FIG. 10 and FIG. 11, respectively. Provided is a transmission or reception method of an eNB and a UE for applying the method of operating a bandwidth part and the method of transmitting or receiving a downlink control channel and a data channel in the 5G communication system corresponding to the embodiment. In order to implement the same, each of the transmitters, the receivers, and the processors of the eNB and the UE needs to operate according to an embodiment.

FIG. 10 is a block diagram illustrating the internal structure of a UE according to an embodiment of the disclosure. As illustrated in FIG. 10, the UE of the disclosure may include a UE processor 1001, a UE receiver 1002, and a UE transmitter 1003.

The UE processor 1001 may control a series of processes such that the UE operates according to the above-described embodiments of the disclosure. For example, the UE processor may differently control a bandwidth part configuration method, a bandwidth part change method, an uplink/downlink data channel and control channel transmission or reception method, and the like according to embodiments of the disclosure. The UE receiver 1002 and the UE transmitter 1003 are commonly called a transceiver in the embodiments of the disclosure.

The transceiver of the UE may perform transmission or reception of a signal with an eNB. The signal may include control information and data. To this end, the transceiver of the UE includes an RF transmitter that up-converts and amplifies a frequency of a transmitted signal, an RF receiver that low-noise amplifies a received signal and down-converts the frequency, and the like. Also, the transceiver outputs, to the UE processor 1001, a signal received via a wireless channel, and transmits a signal output from the UE processor 1001 via a wireless channel.

FIG. 11 is a block diagram illustrating the internal structure of an eNB according to an embodiment of the disclosure. As illustrated in FIG. 11, the eNB of the disclosure may include an eNB processor 1101, an eNB receiver 1102, and an eNB transmitter 1103.

The eNB processor 1101 may control a series of processes such that the eNB operates according to the above-described embodiments of the disclosure. For example, the eNB processor may differently control a bandwidth part configuration method, a bandwidth part change method, an uplink/downlink data channel and control channel transmission or reception method, and the like according to embodiments of the disclosure. The eNB receiver 1102 and the eNB transmitter 1103 are commonly called a transceiver in the embodiments of the disclosure.

The transceiver of the eNB may perform transmission or reception of a signal with a UE. The signal may include control information and data. To this end, the transceiver includes an RF transmitter that up-converts and amplifies a frequency of a transmitted signal, an RF receiver that low-noise amplifies a received signal and down-converts the frequency, and the like. Also, the transceiver of the eNB outputs, to the eNB processor 1101, a signal received via a wireless channel, and transmits a signal output from the eNB processor 1101 via a wireless channel.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

The invention claimed is:

1. A method performed by a terminal in a wireless communication system, the method comprising:
performing transmission or reception of a first signal with a base station on a first bandwidth part;
determining switching from the first bandwidth part to a second bandwidth part based on information indicating the switching, wherein transmission or reception for a second signal is to be performed with the base station on the second bandwidth part;
selecting one of the first signal or the second signal which is transmitted on a data channel; and
during a retuning time associated with the switching, performing one operation of a drop operation or a skip operation for the selected one,
wherein, in case that a difference between a length of a transmission or reception time of the selected one and a length of the retuning time is longer than a predetermined length, the one operation is performed on a part of symbols for the selected one, and
wherein, in case that the difference is shorter than or equal to the predetermined length, the one operation is performed on all the symbols for the selected one.

2. The method as claimed in claim 1, further comprising:
receiving, from the base station, a message comprising the information indicating the switching,
wherein the message is transmitted through a radio resource control (RRC) signaling, a medium access control (MAC) control element (CE), or downlink control information (DCI).

3. The method as claimed in claim 2, wherein the information indicating the switching comprises at least one of first configuration information for measuring a radio resource measurement (RRM), second configuration information for setting the second bandwidth part as a default bandwidth part, and third configuration information for setting a bandwidth part to be activated based on a state of power of the terminal.

4. The method as claimed in claim 1, wherein, in case that the difference is longer than the predetermined length and the selected one is the first signal, the one operation is performed by dropping transmission or reception for at least one last symbol among the symbols corresponding to the first signal, on the first bandwidth part, during the retuning time.

5. The method as claimed in claim 4, wherein the first signal is a physical downlink shared channel (PDSCH) or a physical uplink shared channel (PUSCH), and the second signal is a physical downlink control channel (PDCCH) or a physical uplink control channel (PUCCH).

6. The method as claimed in claim 1, wherein, in case that the difference is shorter than or equal to the predetermined length and the selected one is the second signal, the one operation is performed by skipping transmission or reception for at least one front symbol among symbols corresponding to the second signal, on the second bandwidth part, during the retuning time.

7. The method as claimed in claim 6, wherein the second signal is a physical downlink shared channel (PDSCH) or a physical uplink shared channel (PUSCH) and the first signal is a physical downlink control channel (PDCCH) or a physical uplink control channel (PUCCH).

8. A terminal in a wireless communication system, the terminal comprising:
a transceiver; and
a controller configured to:
control the transceiver to perform transmission or reception of a first signal with a base station on a first bandwidth part;
determine switching from the first bandwidth part to a second bandwidth part based on information indicating the switching, wherein transmission or reception for a second signal is to be performed with the base station on the second bandwidth part;
select one of the first signal or the second signal which is transmitted on a data channel, and
during a retuning time associated with the switching, perform one operation of a drop operation or a skip operation for the selected one,
wherein, in case that a difference between a length of a transmission or reception time of the selected one and a length of the retuning time is longer than a predetermined length, the one operation is performed on a part of symbols for the selected one, and
wherein, in case that the difference is shorter than or equal to the predetermined length, the one operation is performed on all the symbols for the selected one.

9. The terminal as claimed in claim 8,
wherein the controller is configured to control the transceiver to receive, from the base station, a message comprising the information indicating the switching, and
wherein the message is transmitted through a radio resource control (RRC) signaling, a medium access control (MAC) control element (CE), or downlink control information (DCI).

10. The terminal as claimed in claim 9, wherein the information indicating the switching comprises at least one of first configuration information for measuring a radio resource measurement (RRM), second configuration information for setting the second bandwidth part as a default bandwidth part, and third configuration information for setting a bandwidth part to be activated based on a state of power of the terminal.

11. The terminal as claimed in claim 8, wherein, in case that the difference is longer than the predetermined length and the selected one is the first signal, the controller is configured to control the transceiver to perform the one operation by dropping transmission or reception for at least one last symbol among the symbols corresponding to the first signal, on the first bandwidth part, during the retuning time.

12. The terminal as claimed in claim 11, wherein the first signal is a physical downlink shared channel (PDSCH) or a physical uplink shared channel (PUSCH), and the second signal is a physical downlink control channel (PDCCH) or a physical uplink control channel (PUCCH).

13. The terminal as claimed in claim 8, wherein, in case that the difference is shorter than or equal to the predetermined length and the selected one is the second signal, the controller is configured to control the transceiver to perform the one operation by skipping transmission or reception for at least one front symbol among symbols corresponding to the second signal, on the second bandwidth part, during the retuning time.

14. The terminal as claimed in claim 13, wherein the second signal is a physical downlink shared channel (PDSCH) or a physical uplink shared channel (PUSCH) and the first signal is a physical downlink control channel (PDCCH) or a physical uplink control channel (PUCCH).

* * * * *